APPARATUS FOR ADJUSTING A CLOCK PULSE GENERATOR WITH RESPECT TO A DELAY LINE

Filed Dec. 5, 1967

INVENTOR.
MICHEL J. MARTIN
BY
AGENT

United States Patent Office 3,535,698

Patented Oct. 20, 1970

3,535,698

APPARATUS FOR ADJUSTING A CLOCK PULSE GENERATOR WITH RESPECT TO A DELAY LINE

Michel Jean Martin, Sucy-en-Brie, France, assignor, by mesne assignments, to U.S. Philips Corporation, New York, N.Y., a corporation of Delaware Filed Dec. 5, 1967, Ser. No. 688,228
Claims priority, application France, Dec. 14, 1966, 87,370
Int. Cl. G11c *21/00*
U.S. Cl. 340—173 2 Claims

ABSTRACT OF THE DISCLOSURE

A device for adjusting clock pulse periods to equal multiples of the delay of an acoustic line including a frequency divider supplying an adjusting pulse at the end of every clock period. The adjusting pulse is transmitted to a bistable trigger. The trigger also receives a modification of the adjusting pulse after passing through the delay line. The resultant flip-flop signal serves to detune the clock pulse generator and compensate for any delay difference in clock pulse period relative to the delay period.

The invention relates to a memory store comprising mainly an input circuit, an input transducer, an acoustic delay line, an output transducer and an amplifier-pulse shaper, the assembly being controlled by a clock-pulse generator.

It is known that such a store operates satisfactorily for comparatively long periods only when the delay of the delay line and of the members directly co-operating herewith is equal to an integral multiple of the clock period. The invention has for its object to provide means by which this purpose can be attained in a particularly simple manner.

According to the invention this is achieved by providing the store with a further member controlled by the clock-pulse generator and supplying an adjusting pulse every $n$ clock pulses, where $n$ is chosen so that the delay of the acoustic line is at least approximately equal to $n$ clock periods. The adjusting pulses are applied on the one hand to the input circuit and on the other hand to an input terminal of a flip-flop, another input of which receives the delayed adjusting pulses provided by the amplifier-pulse former. The signal supplied by an output terminal of the flip-flop diminishes the clock periods when each delayed adjusting pulse appears each time just before a non-delayed adjusting pulse, and augments it when each delayed adjusting pulse appears each time just after a non-delayed adjusting pulse.

The invention will be described more fully with reference to the drawing.

Figure 1:
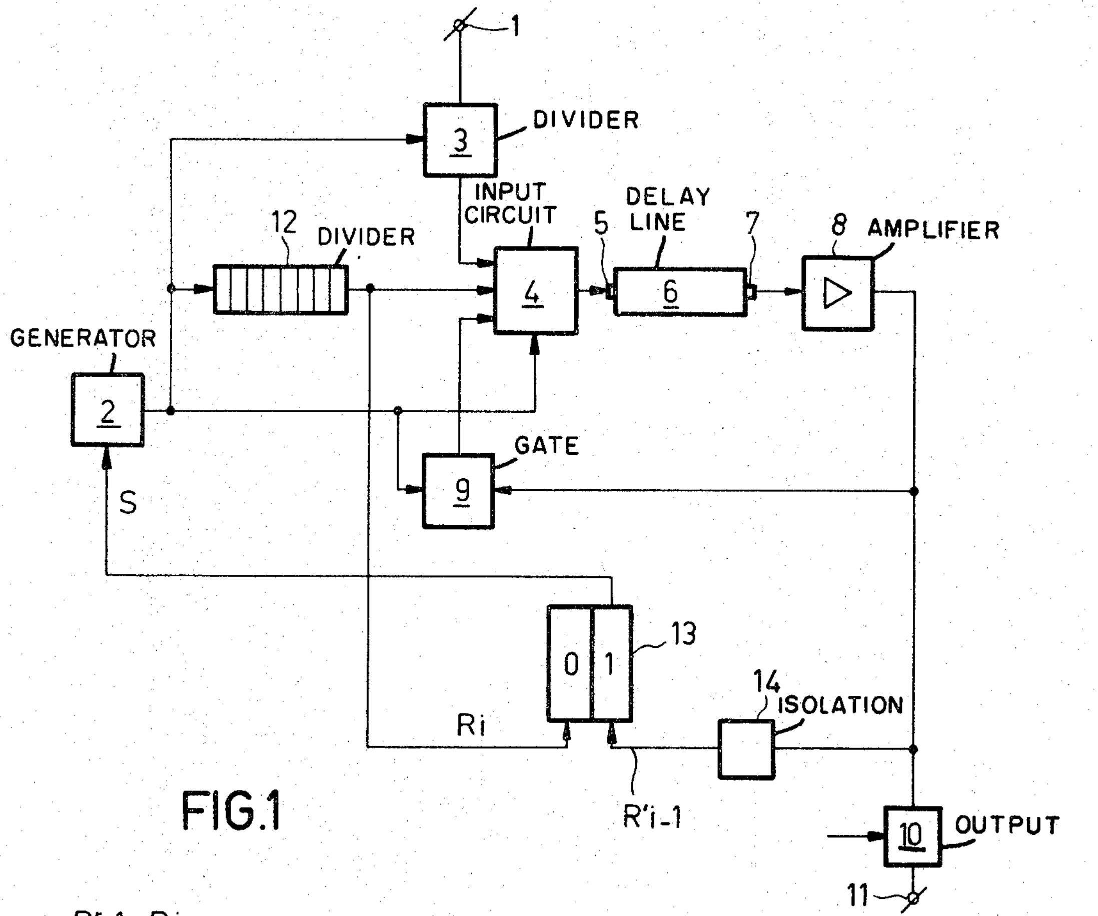
FIG. 1 shows the block diagram of a store having a delay line to which the invention is applied.

Referring to FIG. 1, reference numeral 1 designates a set of input terminals, which receive in parallel form the code groups to be temporarily registered in the store. These code groups are transformed to the series form in a receiving divider 3 (for example a shift register) controlled synchronously by a clock-pulse generator 2 and applied via a synchronously controlled input circuit 4 to the input transducer 5 of the delay line 6 proper (for example, a steel rod or a quartz rod). The input transducer 5 converts the electric oscillations supplied by the input circuit 4 (which correspond to the code elements of the code groups to be stored) into mechanical oscillations, which are transferred by the delay line 6 with a given delay to the output transducer 7, in which the mechanical oscillations are reconverted into electric oscillations. These electric oscillations are amplified in an amplifier-pulse shaper 8 and converted into pulses of the desired shape. The resultant pulses are fed back via a synchronously controlled gate 9 to the input circuit 4. The pulses supplied by the amplifier-pulse shaper 8 may also be applied through a gate 10 to an output terminal 11. All parts mentioned above may be of known structure.

It will be obvious that the device operates satisfactorily for comparatively long periods only when the delay of the assembly 4+5+6+7+8+9 is equal to an integral multiple of the clock period, so that these two quantities must be adjusted one relatively to the other and any deterioration of this adjustment mutual must be compensated. According to the invention this is achieved by means of two additional members 12 and 13.

The member 12 is, in fact, a frequency divider (for example, a binary counting circuit), which supplies at every $n$ clock pulses one output pulse, termed adjusting pulse, the number $n$ being chosen so that the delay of the combination 4+5+6+7+8+9 is, at least approximately, equal to $n$ clock periods. The adjusting pulses are applied both to an input terminal of the input circuit 4 and to an input terminal of the additional member 13. The latter member is a bistable trigger circuit or a flip-flop. The flip-flop 13 receives at its other input the adjusting pulses delayed by the combination 4+5+6+7+8, which are isolated by a member 14 from the signal supplied by the amplifier-pulse shaper 8. If the delay of the combination 4+5+6+7+8+14 is exactly equal to $n$ clock pulses, the flip-flop receives simultaneously a pulse at both its inputs, one signal being supplied directly by the frequency divider 12 and the other having passed through the combination 4+5+6+7+8+14 originates consequently from the preceding adjusting pulse supplied by the frequency divider 12.

Figure 2:
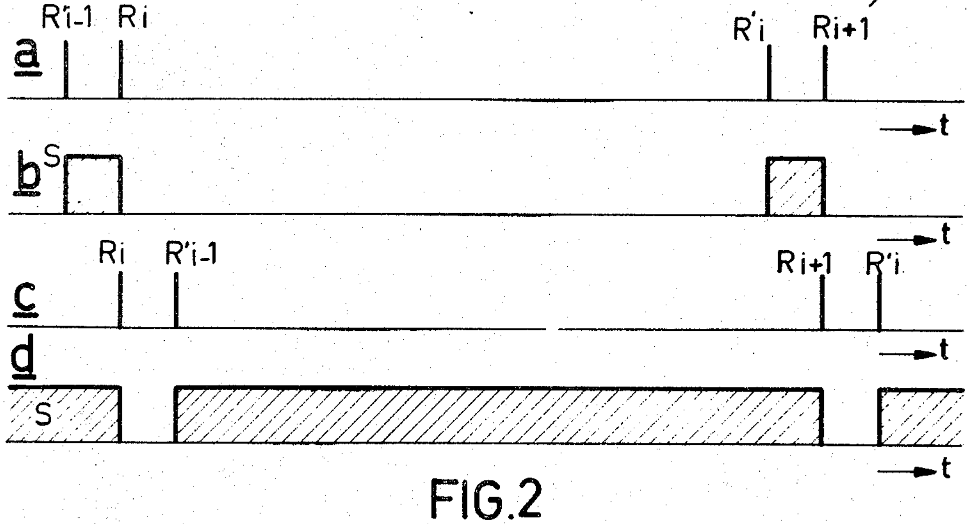
FIG. 2 shows two diagrams for explaining the operation of the arrangement according to the invention.

The graph of FIG. 2*a* relates to the case in which the delay line is slightly too short and thus provides too short a delay. In this case the right-hand input terminal of the flip-flop 13 receives each time an adjusting pulse $R'_{i-1}$ from the amplifier-pulse former 8 just before its left-hand input terminal receives an adjusting pulse $R_i$ from the frequency divider 12. The flip-flop 13 thus supplies in this case the signal S consisting of positive pulses, which is indicated in the graph of FIG. 2*b*.

The graph of FIG. 2*c* relates to the case in which the delay line 6 is slightly too long and hence produces too long a delay. In this case the pulse $R'_{i-1}$ appears each time slightly after the pulse $R_i$ and the flip-flop 13 supplies the signal indicated in the graph of FIG. 2*d*, which can be converted in known manner and by known means into a signal consisting of negative pulses.

The duration of the positive or negative pulses supplied by the flip-flop 13 is a measure for the relative detuning of the delay line 6 and the clock-pulse generator 2. The latter may be constructed so that it responds to positive pulses by diminishing the clock period and to negative pulses by augmenting the clock period, while the diminution or augmentation is proportional to the duration of the positive or negative pulses respectively. The signal consisting of pulses may for this purpose be integrated, so that a direct voltage proportional to the detuning is obtained.

What is claimed is:

1. A memory store comprising an input circuit, an input transducer coupled to said input circuit, an acoustic delay line coupled to said input transducer, an output transducer coupled to said delay line, an amplifier-pulse shaper coupled to said output transducer, a clock pulse generator, first means coupled to said clock-pulse generator and responsive thereto for supplying every $n$ clock pulses an adjusting pulse, $n$ being chosen such that the delay of the acoustic line is at least approximately equal to $n$ clock periods, second means applying said adjusting pulses to said input circuit, third means applying said adjusting pulses to an input terminal of a flip-flop, fourth means applying the delayed adjusting pulses from said amplifier-pulse shaper to a further input of said flip-flop, said flip-flop providing a first output condition when each delayed adjusting pulse appears before a none-delayed adjusting pulse, said flip-flop providing a second output condition when each delayed adjusting pulse appears after a nondelayed adjusting pulse.

2. The combination of claim 1 wherein said first means is a frequency divider.

References Cited

UNITED STATES PATENTS 2,961,535 11/1960 Lanning ------------- 328—55

TERRELL W. FEARS, Primary Examiner

U.S. Cl. X.R.

333—30